Nov. 4, 1952 — D. K. ALLISON — 2,617,032
NAVIGATIONAL DEVICE
Filed Oct. 18, 1946 — 3 Sheets-Sheet 1
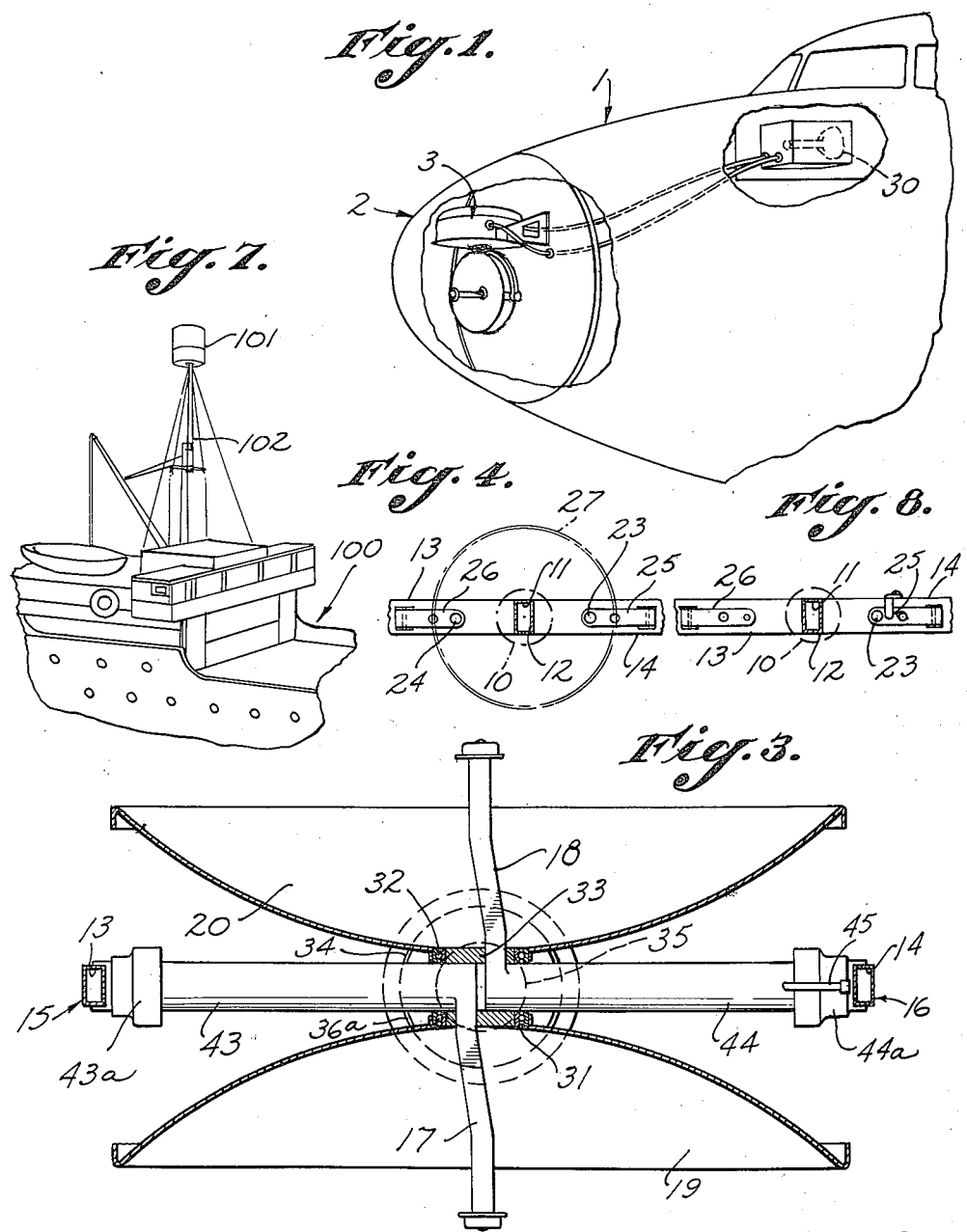
INVENTOR:
DONALD K. ALLISON,

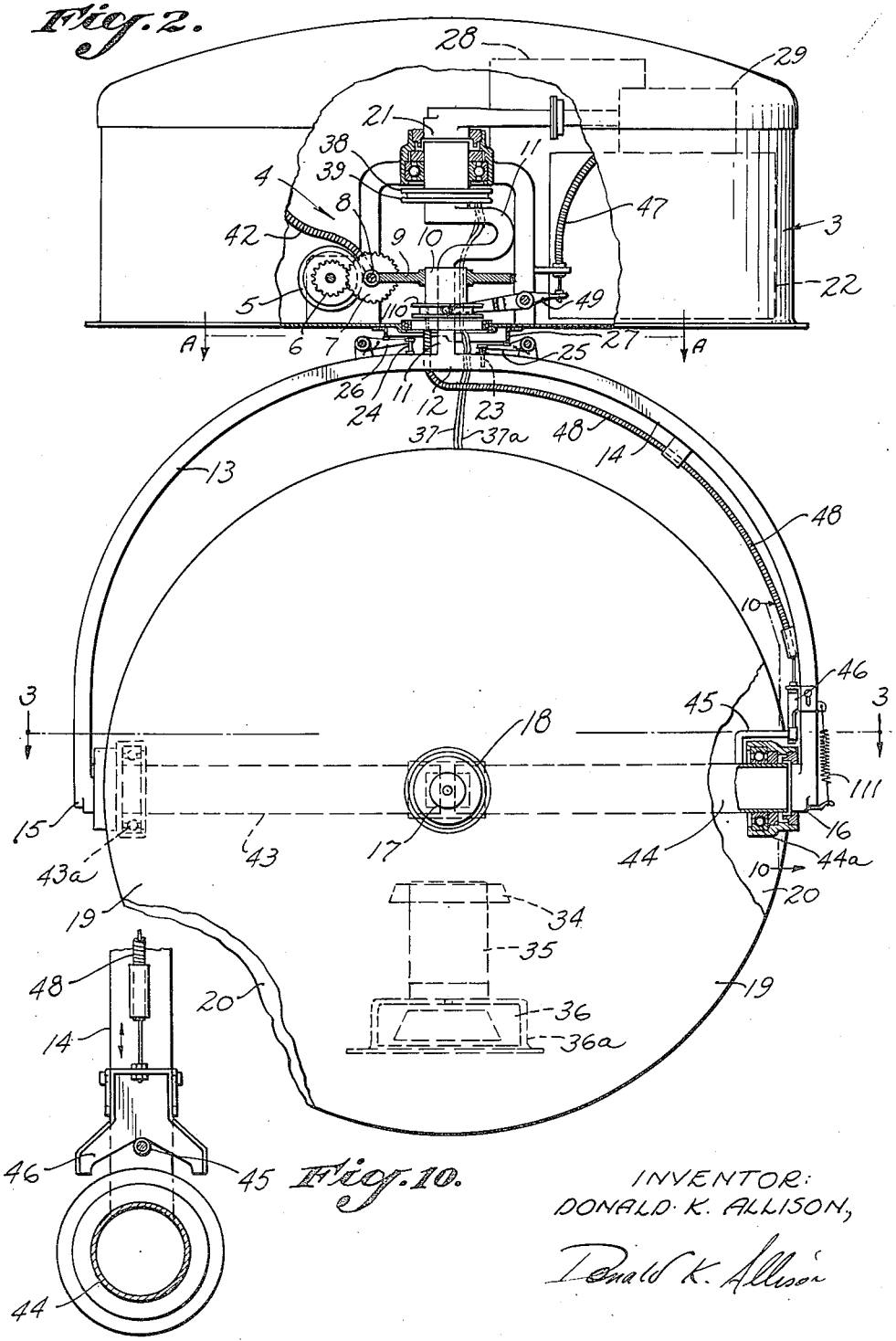

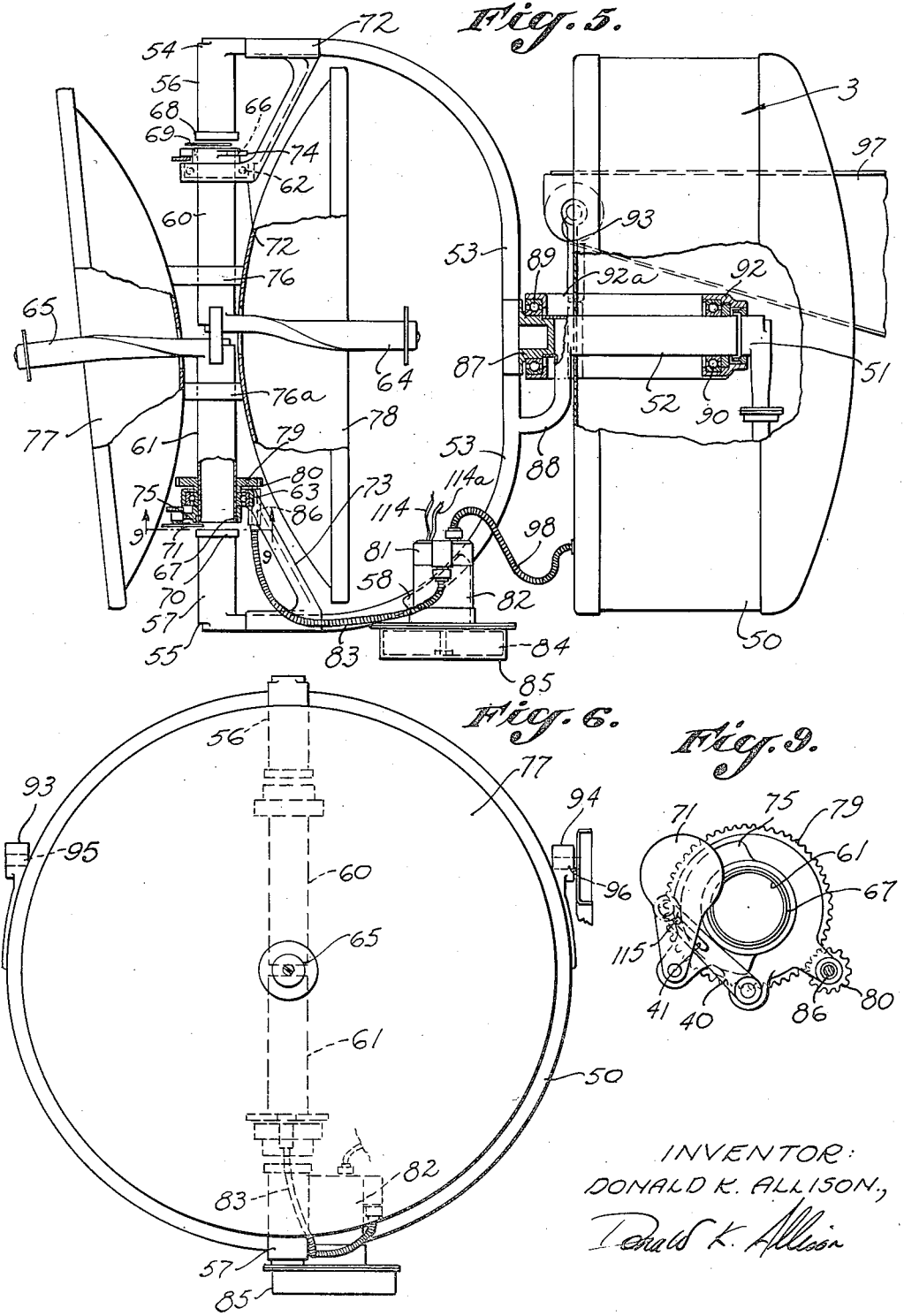

Patented Nov. 4, 1952

2,617,032

UNITED STATES PATENT OFFICE 2,617,032

NAVIGATIONAL DEVICE

Donald K. Allison, Washington, D. C.

Application October 18, 1946, Serial No. 704,071

8 Claims. (Cl. 250—33.65)

My invention relates generally to electronic navigational devices, such as may be installed upon aircraft to give indications of terrain features and obstructions with which the aircraft might collide, other aircraft in the proximal air strata, and of storms and certain other meterological conditions. Such equipment may also be installed upon vessels to furnish navigational indications of shorelines, electronic beacons, other vessels, icebergs, and aircraft, and also information regarding the location and extent of storms.

It has been found to be of utmost importance, for example, in the operation of aircraft, that the pilot have available, when flying under conditions of impaired visibility, a presentation of the terrain and of other aircraft in his vicinity, and an indication of their altitude relative to his aircraft, in order that collisions may be avoided. Similarly, in the operation of water-borne craft such as steamships it has been found to be extremely valuable to the navigator or helmsman to be aware of the presence and location of rocks, beacons, buoys, inlets, and other vessels, under conditions of zero visibility such as at night or in fogs.

In addition to the above mentioned civilian needs for such equipment, extensive applications have been found in the field of military operations and devices.

The general name of "radar" has been employed to describe these systems employing high-frequency radio waves for "electronic-seeing." The radar systems in common use today employ a high-frequency radio transmitter sending out short powerful bursts of microwave energy, in a directional beam formed by a reflector. Upon striking an object, a portion of the power of the burst is reflected back to the system, and the reflected energy is directed by the reflector into a high-gain receiver, and thence to the screen of a cathode-ray tube, whereon it becomes visible.

Since the time interval between transmission of the initial burst of energy (the "main-bang," in the nomenclature of the art) and the reception of the reflected echo or "target-signal," is very short, the direction in which the reflector is pointing during that time interval gives the direction of the object causing the reflection, and the time elapsed between the "main-bang" and the "target-signal" gives the distance or range of the object.

In the majority of radar devices, the same reflector is used to transmit the "main-bang" and receive the reflected echoes thereof. By causing this reflector to move in a predetermined manner, a "scan" of any desired region or volume in space is obtained; consequently, radar reflectors so arranged that they continuously and automatically scan a space volume are called scanning antennas, or "radar scanners."

One pattern of radar scan commonly employed is contemplated to provide a continuous "scan" around the horizon through an arc depending on the navigational requirements of the radar and the mounting limitations of the radar scanner.

When full 360° coverage is mandatory, the scanner is mounted in such position on the aircraft or vessel that virtually unobstructed scanning through 360° is possible. In the case of aircraft, such mounting must in most cases be made with the wind-protective enclosure for the scanner, termed the "radome," projecting from the surface of the airframe. In high-speed aircraft, the drag on this radome becames excessive and therefore recourse is had to mounting the scanner in the nose or some forward-looking portion of the airframe, arranged to scan only some arc of the forward sector.

In the past, sector-scanning has been achieved through an oscillatory or reciprocating motion of the reflector. Such motion has been found to be mechanically unsound in the light-weight mechanisms that necessity dictates for aircraft equipment, and in addition high scanning rates are virtually impossible. Also, the oscillatory type of sector scanner is ordinarily mechanically distinct from the 360° rotary scanner, and can not be adapted to this type of scan.

In the use of radar for aircraft navigation, it has been found desirable to provide indication to the pilot whether a target producing a radar echo is at or below the altitude of the aircraft. In sector scanning of the oscillatory type, this has been accomplished only by means of complex mechanisms and controls. In the scanners forming the subject of this invention, relative altitude differentiation is very simply obtained.

A further consideration in the art of radar navigation lies in the fact that neither aircraft nor vessels present a stable platform; both undergo varying degrees of pitch, roll and yaw when under way. Ordinarily, deviations due to yaw are of no consequence, but instability of the radar scanner in pitch and roll tends to distort the radar presentation, reduce range, reduce coverage, and of course makes impossible radar fire control.

It is therefore a major object of my invention to provide a radar scanner stabilized by gyro-action in pitch and roll.

An additional object of my invention is to provide a radar scanner which will furnish relative altitude differentiation of targets.

It is a further object of my invention to provide a radar scanner of extreme lightness and simplicity.

A still further object of my invention is to provide a radar scanner which may be used for either 360° rotary scan or 180° sector scan with no major changes in the mechanism.

These and other objects and advantages of my invention will become apparent from the following description of preferred and modified forms thereof, and from the drawings illustrating those forms, in which:

Fig. 1 shows the preferred form of my radar scanner, nose mounted in an aircraft for 180° forward scanning.

Fig. 2 is a side view in partial section of the preferred form of my radar scanner.

Fig. 3 is a sectional view indicated by the arrows 3—3 of Fig. 2.

Fig. 4 is a detail taken at A—A of the microwave T-switch mechanism of Fig. 2 adjusted for 180° scanning.

Fig. 5 shows a side view in partial section of an alternative form of my invention.

Fig. 6 is a front view of the scanner of Fig. 5.

Fig. 7 shows the radar scanner of Figs. 1, 2 and 3 mounted on a vessel for 360° radar scanning.

Fig. 8 shows a microwave T-switch of Fig. 4 adjusted for 360° scanning.

Fig. 9 is a sectional view of the microwave switch indicated by the arrows 9—9 of Fig. 5.

Fig. 10 is a sectional view of the caging mechanism indicated by arrows 10—10 of Fig. 2.

Referring now to the drawings, and particularly to Figs. 1, 2 and 3 thereof, the numeral 1 indicates an aircraft having my radar scanner mounted in the nose thereof. The nose section of the aircraft includes a radome 2, made from a material transparent to microwave energy. The housing 3 contains the electronic components of power supply, modulator, transmitter, receiver and electronic switch of the radar set. These components are well known in the art, and form no part of my invention. They will therefore be indicated in block form and will not be described further. The housing 3 surrounds and supports the antenna drive unit 4, which includes the motor 5 driving the gears 6, 7, 8 and 9 to produce rotation of the spindle 10. The spindle 10 carries the waveguide section 11 which passes through the spindle and divides into the T-switch 12. The two arms of the T-switch continue as wave-guide 13 and 14, which connect through the rotary-joints 15 and 16 respectively, to the circular wave-guides 43 and 44, which are supported by and rotate in the bearings 43a and 44a. The circular wave-guides 43 and 44 terminate in antenna feeds 17 and 18 respectively. Microwave energy from the antenna feeds 17 and 18 is directed toward the reflectors 19 and 20, whereby it is concentrated into a beam and projected into space.

Microwave energy is delivered to the spindle 10 through the rotary-joint 21 which in turn receives power from the transmitter 22 through the electronic switch 29. Microwave energy passing through the spindle 10 and the waveguide section 11 divides at the T-switch 12. Referring also now to Fig. 4, the shorting-pins 23 and 24, mounted respectively on the pivot-arms 25 and 26, are driven by the cam 27 in such a manner that when the shorting-pin 23 is inserted into the wave-guide 14 the shorting-pin 24 is withdrawn from the wave-guide 13, and vice-versa. These shorting-pins form the active element of the microwave T-switch 12. When the shorting-pin 23 is inserted, as shown in Fig. 2, it serves to act as a complete reflector for all microwave energy reaching it; consequently, all transmitted microwave energy passing through the spindle 10 and the wave-guide section 11 is directed through the wave-guide 13, the rotary-joint 15, and circular wave-guide 43, to the antenna feed 17, and thence is directed by the reflector 19 into space.

The reflected echoes of this microwave energy which strike the reflector 19 are directed into the antenna feed 17, and are conducted through the circular wave-guide 43, thence to the rotary-joint 15, the wave-guide 13, the T-switch 12 to the wave-guide section 11, and thence through the spindle 10 and the rotary-joint 21 are directed by the electronic switch 29 into the receiver 28. Detected, and amplified, the echoes are made visible upon a cathode-ray tube 30, mounted in the aircraft in a suitable position for its indications to be visible to the pilot of the aircraft.

It is important to note that the cam 27 of the T-switch 12 is so arranged that the reflector which is traversing the desired region is activated. For example, in nose-installations in aircraft, the cam 27 is so designed and arranged that the change-over points are at 90° to the longitudinal axis of the aircraft, so that the forward-looking reflector is activated for operation.

Referring again to Figs. 2 and 3, the reflector 19 is mounted upon the outer race of the ball-bearing 31, and the reflector 20 is mounted upon the outer race of the ball-bearing 32. The inner races of the bearings 31 and 32 are positioned upon the casting 33 which in turn secures and positions the antenna feeds 17 and 18.

The reflectors 19 and 20 are joined by the bridge 34, which carries the motor 35, which serves to drive the gyro-rotor 36. Windage drag on the gyro-rotor 36 is reduced by the rotor housing 36a. Power is supplied to the motor 35 through the leads 37 and 37a, which are energized from the slip-rings 38 and 39.

As is shown in Fig 2, the shaft for the gear 8 is connected to a flexible shaft 42, which serves to transmit azimuthal information to the sweep drive for the cathode-ray tube 30.

The circular wave-guide 44 of Figs. 2 and 10 carries the limit-stop 45, movable through an arc determined by the caging-stop 46. When the caging-stop is held in its retracted position, the reflectors 19 and 20 are free to perform stabilization tilt motion over ranges up to 30°. If for any reason it is desired to restrain or "cage" this motion, the caging-stop 46 is allowed to move to its lower extreme position by pulling the caging control cable 47, thereby causing the lever 49 to move the ring 110 downwardly, releasing the flexible cable 48 to permit the spring 111 to draw the caging-stop 46 into full engagement with the limit stop 45, thereby locking this latter in its neutral position, as is best shown in Fig. 10.

Referring now to Figs. 5 and 6, an alternative form of my invention is shown. In the figures, the housing 50 encloses the power supply, modulator, transmitter, receiver, and electronic switch components for the radar set. Micro-wave energy is conducted through the rotary-joint 51 and the spindle 52 through the wave-guide bend 88 to the rectangular wave-guide bow 53. The two ends of the wave-guide bow pass through the transitions 54 and 55 into the stationary spindles 56 and 57 respectively. The rotating spindles 60 and 61 are supported on the bearings 62 and 63 which are in turn carried in the castings 72 and 73 mounted on the wave-guide bow 53. The spindles 60 and 61 terminate in the horizontally polarized antenna feeds 64 and 65 respectively. The rotating spindle 60 is furnished with the microwave choke 66, and the rotating spindle 61 is furnished with the microwave choke 67. The flange 68, mounted on the stationary spindle 56, is spaced sufficiently from the choke 66 to permit entry of the shutter 69. Similarly, the flange 70, mounted on the spindle 57, is spaced from the choke 67 to permit entry of the shutter 71.

The shutters 69 and 71 are pivotally mounted upon the castings 72 and 73 respectively. Mounted externally upon the choke 66 is the cam 74, actuating the shutter 69. Similarly mounted upon the choke 67 is the cam 75 actuating the shutter 71; this arrangement is more clearly shown in Fig. 9. As will be seen in Fig. 9, the cam follower 40 is furnished with the slot 41, which engages the pin 115, mounted upon the shutter 71. Motion of the cam-follower 40, produced by rotation of the cam 75, thereby causes the shutter to alternately open and close the path for the microwave energy through the choke-joint formed by the choke 67 and the flange 70. The shutter 69 is arranged to operate in synchronous opposition to the shutter 71.

The cams 74 and 75 are so arranged that only the forward-looking reflector is capable of transmitting and conducting microwave energy from and to the radar set. When nose-mounted in an aircraft, for example, when the reflector 77 is traversing the forward 180° of arc the shutter 71 is open and the shutter 69 is closed, thereby energizing the antenna feed 65 and placing the reflector 77 is operation. When the reflector 77 has traversed substantially 180°, and has reached a point normal to the longitudinal axis of the airplane, the cam 75 causes the shutter 71 to close, and simultaneously the cam 74 causes the shutter 69 to open, and to thereby energize the antenna feed 64. The reflector 78 is now in operation, and proceeds to scan through 180°, after which the reverse of the above action takes place.

The rotating spindles 60 and 61 are mounted in and positioned by the bridges 76 and 76a, which also serve to support the reflectors 77 and 78. The rotating spindle 61 carries the gear 79, which is meshed with the gear 80. The gear 80 is mounted upon the shaft 86, supported on the casting 73. The gear 80 is driven from the gear-box 81 of the drive motor 82 through the flexible shaft 83. The drive motor 82 also supports and drives the gyro-rotor 84, rotating at high speed in the rotor housing 85. The drive motor 82 receives power through the flexible leads 114 and 114a, and is mounted on the casting 58, which is in turn supported by the wave-guide bow 83.

The spindle 52 is closed at one end by the casting 87, which serves to form the transition into the wave-guide bend 88. The casting 87 and the spindle 52 are fitted into the inner races of the bearings 89 and 90 respectively. The outer races of the bearing 89 and 90 are clamped between the castings 92 and 92a, which in turn serve to support the scanner assembly from the housing 50.

The housing 50 mounts the castings 93 and 94, which support the complete radar and scanner assembly through the bearings 95 and 96, and the mounting frame 97. From the gear-box 81, the flexible shaft 98 conveys azimuth information to the azimuth drive for the cathode-ray tube 30.

Referring now to Fig. 7, the numeral 100 indicates a vessel, having a radar of the type shown in Figs. 2 and 3 mounted at the head of the mast 102 and protected from the elements by a housing 101, which is transparent to microwaves in its lower portion. In this position the equipment is adapted to scan the full 360° of the horizon. Consequently, the switching action of the T-switch is not necessary, and the arrangement shown in Fig. 8 is employed. As shown in the figure, the shorting-pin 23 mounted on the pivot arm 25, is locked in the inserted position, and the shorting-pin 24 is removed. Under this arrangement, only the reflector 19 is active, and serves to scan through a complete circle.

*Operation of the preferred form of my invention*

Ordinarily, an airborne radar set is not required to be in operation until the aircraft is in flight and at an appreciable altitude above the ground. After a radar set has been turned on, a warm-up period customarily intervenes to insure correct operation of the high-power oscillator; this period also permits the stabilization gyro to come up to speed. This sequence of operations may take place before the aircraft has become airborne, if the conditions so require.

The caging-stop 46 should be in the locked or caged position during take-off or landing of the aircraft. In the air, with the aircraft in level flight, and with the radar set in operation, the caging control cable 47 should be pulled, releasing the caging-stop 46 from the limit-stop 45, and placing the stabilization function in operation. The motor 5 is arranged to begin operating when the radar set is turned on, driving the reflectors 19 and 20 at a speed of approximately 30 R. P. M., so that the scanner is now scanning the forward 180° of the horizon. As each reflector rotates into the forward sector, it is activated for operation by the action of the T-switch 12; as the rotation carries the reflectors into the rearward sector, the T-switch deactivates this reflector. Consequently all of the power from the high-frequency oscillator is directed usefully, and in addition, a rotational speed of only 30 R. P. M. produces a sequence of 60 scans or frames per minute.

Optimum radar scanning is obtained when the beam from the reflectors sweeps through a uniform course with respect to the horizon. Pitch and roll of the aircraft distort this course, so that a large portion of the desired area is not covered. The gyro-stabilization feature of my invention causes the radar beam to traverse a level course regardless of pitch and/or roll of the aircraft upon which the scanner is mounted.

As may be seen from Figs. 1 and 2, pitch and roll of the aircraft are accommodate in the following manner. Consider the figures to represent an instant when the rotating scanner reflector 19 is pointed directly forward. If now at this moment the nose of the aircraft pitches downward, the housing 3, attached firmly to the aircraft, in effect moves through a forward arc with respect to the reflector 19. This latter, however, because of the forces exerted by the gyro-rotor 36, remains in its original position, and the plane of scan is unchanged. If at the same instant that the nose pitches downward, the aircraft also enters a condition of roll, as for example a right bank, the reflectors 19 and 20, being stabilized likewise against deviations in this axis, rotate on the bearings 31 and 32, so that no precesson is induced in the gyro system. Careful consideration will show that any combination of conditions of pitch and roll up to rather wide limits may be accommodated by this stabilization arrangement. Since motion in yaw is around the axis of rotation of the gyro system, this is without effect on the stabilization.

Should for any reason the stabilized reflector system become displaced from the desired plane of rotation, or should it become desirable to restrain or "cage" the gyro system, the pilot may do so by pulling the caging control cable 47, causing the lever 49 to move the ring 110 downwardly, and releasing the flexible cable 48 to permit the spring 111 to draw the caging-stop 46 into locked engagement with the limit-stop 45.

The center of gravity of the combined reflector and gyro systems lies below their center of suspension. Therefore, the system is slightly pendulous, i. e. gravity-seeking, and will find a position of scan around a vertical axis, and thereby cancel any precessions attributable to long turns, or to friction in the bearings 31, 32, 43a, and 44a.

When mounted at the masthead of a vessel, as shown in Fig. 7, it becomes desirable to scan the entire 360° of the horizon. To obtain this condition, the action of the cam 27 is negatived by arranging the shorting-pins 23 and 24 as is shown in Fig. 8, so that all of the radar process is conducted through the reflector 19. This reflector then continuously scans the horizon and intervening space. Conditions of pitch and roll of the vessel carrying this radar scanner are transmitted through the mast to the scanner. However, because of the stabilizing action of the gyro as described above, the reflector 19 maintains a horizontal plane of scan. Likewise, the gravity-seeking suspension for the gyro system causes it to find a vertical position despite displacement and/or precessions.

The bursts or pulses of microwave energy sent out from the reflector 19 are reflected from objects such as shorelines, icebergs, vessels, buoys, etc., and the echoes are received on the reflector, and detected, amplified, and finally made visible upon a cathode-ray tube mounted in the pilot-house or navigator's position of the vessel. The target indications are presented in range and bearing relationship so that their positions relative to the subject vessel are readily ascertainable.

*Operation of alternative form of my invention*

The alternative form of my invention, one modification of which is shown in Figs. 5 and 6, is intended to perform substantially the same functions as specified for the hitherto described preferred form of my invention. The arrangement of the components of this alternative form is such that it is particularly adapted to nose-mounting in aircraft. In addition, this alternative form includes the feature of relative altitude differentiation, although it will be apparent from the description hereinafter given that this relative altitude feature may be included in the preferred form if desired.

In the operation of this form of my invention, the radar preferably is not started until the aircraft is in flight and level flight conditions obtained. When the radar set is then turned on, the drive motor 82 is energized, driving the reflectors 77 and 78 at a rotational speed of approximately 30 R. P. M.; this speed may be varied 20 R. P. M. in either direction, depending on the nature of the radar components, repetition rate of the microwave bursts, cathode-ray tube characteristics, etc. The drive motor 82 also serves to rotate the gyro-rotor 84 at a high speed. The rotational inertia existing in the gyro-rotor serves to stabilize the scanning pattern in the following manner. Referring to Fig. 5, assume that the radar scanner shown in the figure represents an installation in the nose of an aircraft in level flight toward the left. Should the nose of the aircraft now rise in an attitude of climb, the stabilizing effect of the gyro-rotor 84 and the mass inertia of the assembly causes the entire assembly of radar components and scanner to remain level with respect to the horizon; the requisite rotation is accommodated in the bearings 95 and 96. Referring again to Fig. 5, if we picture a condition of roll of the aircraft about a longitudinal axis in the plane of the paper, again the stabilization forces of the gyro-rotor serve to maintain transverse stability about the axis of the bearings 89 and 90, so that the space relationship of the scanning pattern remains unchanged. Also, as is apparent from the figure, the reflector and drive motor assembly is pendulous about the axis of suspension defined by the bearings 89 and 90, and the entire assembly is swung in such a manner from the bearings 95 and 96 as to be balanced and slightly pendulous below the transverse axis described by the bearings 95 and 96. Because of this, the system tends to stabilize itself to gravity, and transient precessions and displacements are corrected thereby.

The electronic components contained in the housing 50 deliver short high-power micro-wave frequency pulses of energy through the rotary-joint 51 the spindle 52 and the wave-guide bend 88, to the wave-guide bow 53, and thence through the transitions 54 and 55 to the spindles 56 and 57, and to the micro-wave chokes 66 and 67. Here the action of the shutters 69 and 71 serves to direct the micro-wave energy through either the antenna feed 64 or the antenna feed 65 to the corresponding reflector.

The reflectors 77 and 78 rotate continuously, driven by the motor 82 through the flexible shaft 83 and the gears 80 and 81. It will be observed that while the reflector 78 is arranged to send the reflected beam of microwave energy outward horizontally, i. e. to sweep through a substantially horizontal plane, the reflector 77 is arranged to direct its beam downwardly at an angle, thereby describing an annular conical volume below the discoid volume swept by the horizontal beam. The azimuth drive for the cathode-ray tube in the pilot's compartment is so arranged that a distinctive indication is given showing whether the upper or lower beam is in operation. This indication may take the form of intensification of the trace on the cathode-ray tube during one of the trace sweeps, or a color indication of the beam in operation at that moment.

The above combination operates to provide the pilot with relative altitude differentiation. During the period when the horizontal beam from the reflector 78 is traversing the forward sector, all objects at approximately the same altitude as the aircraft, reflect microwave energy into the reflector 78, and thence through the wave-guide system into the receiver and on to the cathode-ray tube as described for the system of Fig. 1. The microwave echoes result in bright spots or traces on the face of the cathode ray tube in a position corresponding to their bearing and range from the aircraft carrying the radar. Furthermore the distinctive indication during the scan by the reflector 78 serves to remind the pilot that the targets or echoes presented on the scope are at or above the altitude of his aircraft, and therefore represent potential collision sources. The amount of micro-wave energy directed downward during the scan of the reflector 78 is relatively small, so that the corresponding mapping or "ground-painting" is slight. During the scan from the reflector 77, which is inclined downwardly at an anble of 10° to 15°, the amount of microwave energy directed toward and reflected from the ground surface is greatly increased, and there results an enhanced presentation of terrain features for navigational purposes. By appraisal of relative intensities and movement between traces during the two scanning sweeps, the pilot may readily differentiate the relative altitude of targets. The inclined beam is also of great benefit for operations involving interrogated radar beacons, since sufficient energy is directed downwardly from the inclined beam to give positive "triggering" of ground beacons from high altitudes.

It will be obvious that in this alternative form of my invention that additional reflectors may be employed if it is desired to scan smaller space angles; thus for 90° scanning, four reflectors would be used. Certain modifications in the switching of the microwave energy to the reflectors will be necessary; these modifications would present no difficulty to a person skilled in the art.

Having described and illustrated my invention and its modifications, I do not wish to be limited to the particular form and parts herein shown, or to the particular arrangement thereof described herein, except as covered by my appended claims.

I claim:

1. A navigational device of the class described which includes: a plurality of antenna means for microwave energy, spaced and rotatable about a first axis; gyroscopic means normally having its spin axis parallel to said first axis and acting directly upon said antenna means; a support for said antenna means and said gyroscopic means providing for rotation of both of said means about a pair of mutually perpendicular axes perpendicular to said first axis, thereby providing three degrees of freedom for said gyroscopic means and said antenna means; translating means for generating and receiving microwave energy; driving means for rotating said antenna means about said first axis; microwave transmission means extending between said translating means and each of said antenna means; and separate means each connected to the individual portion of said microwave transmission means extending to one of said antenna means and individually operated by the rotation of said antenna means to render said individual portions of said transmission means successively conductive and non-conductive, whereby the individual antenna means sequentially scan a volume while operatively connected to said translating means.

2. A navigational device of the class described which includes: a plurality of microwave antenna means; a microwave receiver; means for supporting said antenna means for rotation about a first axis and for movement about a pair of mutually perpendicular axes perpendicular to said first axis; gyroscopic means directly connected to said antenna means and normally having its spin axis parallel to said first axis, said gyroscopic means thereby stabilizing directly the position of said antenna means; driving means for rotating said plurality of antenna means about said first axis; microwave transmission means having a trunk connected to said receiver and a plurality of branches each of which is connected to one of said antenna means; and separate means each connected to one of said branches of said transmission means and individually operated by the rotation of said antenna means about said first axis for rendering one of said branches non-transmissive and at the same time rendering another of said branches transmissive, whereby said antenna means are sequentially connected to said receiver and sequentially scan a volume.

3. A navigational device of the class described which includes: a plurality of microwave antenna means; a microwave receiver; means for supporting said antenna means for rotation about a first axis and for movement about a pair of mutually perpendicular axes perpendicular to said first axis; gyroscopic means directly connected to said antenna means and normally having its spin axis parallel to said first axis, said gyroscopic means thereby stabilizing directly the position of said antenna means; driving means for rotating said plurality of antenna means about said first axis; microwave transmission means having a trunk connected to said receiver and a plurality of branches each of which is connected to one of said antenna means; a microwave transmission-preventing means associated with each of said branches; and means for mechanically inserting one of said transmission-preventing means in its associated branch through an aperture therein at the same time another of said transmission-preventing means is removed from its associated branch, whereby said antenna means are stabilized and sequentially scan a volume.

4. A navigational device of the class described which includes: a plurality of antenna means for micrawave energy; translating means for generating and receiving microwave energy; a mounting for said antenna means providing for rotation about three mutually perpendicular axes; driving means rotating said antenna means about a first axis; gyroscopic means mounted with said antenna means to stabilize directly the position thereof, the spin axis of said gyroscopic means normally being parallel to said first axis and movable about the remaining two of said perpendicular axes to provide three degrees of freedom for said gyroscopic means; a wave-guide having a trunk extending from said translating means and stationary with respect thereto, and having branches extending to each of said antenna means and moving therewith, at least a portion of said wave-guide being rotatable about said first axis and said perpendicular axes to transmit microwave energy between said antennas and said translating means; means mechanically insertable in an aperture in each of said branches to prevent the transmission of microwave energy therethrough; and means operated by the rotation of said antenna means to insert one of said transmission-preventing means in a branch at the same time another of said transmission-preventing means is removed from another branch, whereby the separate antenna means are sequentially connected to said translating means.

5. A navigational device of the class described which includes: a plurality of radiant energy receiving means spaced and rotatable about a first axis; a support for said receiving means providing for movement of said means about a pair of mutually perpendicular axes perpendicular to said first axis; a gyroscope directly and mechanically connected to said plurality of receiving means for movement therewith about said mutually perpendicular axes, the spin axis of said gyroscope normally being substantially parallel to said first axis and the remaining two degrees of freedom of said gyroscope being provided by said movement of said support about said mutually perpendicular axes, whereby said gyroscope directly and mechanically stabilizes said plurality of receiving means; and a drive for rotating said plurality of receiving means about said first axis for sequential scanning of a volume.

6. A navigational device of the class described which includes: a plurality of radiant energy receiving means spaced about a first axis and facing outwardly therefrom; a support rotatable about said first axis; a member held by said support for rotation about a second axis perpendicular to said first axis; means mounting said energy receiving means upon said member for rotation about a third axis perpendicular to said first and second axes; a gyroscope mounted on said energy receiving means for directly stabilizing the latter, the spin axis of said gyroscope normally being substantially parallel to said first axis and the other two degrees of freedom of said gyroscope being provided by said movement of said member and said mounting means about their respective said axes; and driving means for rotating said support about said first axis.

7. A navigational device of the class described which includes: a plurality of radiant energy receiving means spaced and rotatable about a first axis; a member rotatable about said first axis, carrying said energy receiving means; a frame connected to said member and rotatable about a second axis perpendicular to said first axis; a support carrying said frame and rotatable about a third axis perpendicular to said first and second axes; a gyroscope mounted on said frame to directly stabilize the latter, the spin axis of said gyroscope being parallel to said first axis and the remaining two degrees of freedom of said gyroscope being the movement of said frame and said support about said second and third axes, respectively; and driving means for rotating said member and said energy receiving means about said first axis.

8. A navigational device of the class described which includes: a plurality of microwave antennas spaced and rotatable about an axis; a microwave receiver; a wave guide having a trunk connected to said receiver and a plurality of branches each connected to one of said antennas for rotation therewith about said axis; a microwave reflecting means in each of said branches comprising a pin insertable through an aperture on said wave-guide, said pin being small compared to the cross-sectional area of said wave-guide, but located in said wave-guide in a position to act as a substantially complete reflector for microwave energy to prevent the transmission of microwave energy between said receiver and the antenna associated with the corresponding branch, each of said pins being removable from its associated branch to connect its associated antenna to said receiver for the transmission of microwave energy therebetween; a drive for rotating said plurality of antennas about said axis; and cam means driven by the rotation of said antenna means about said axis for mechanically moving one of said pins along its axis to remove said pin from its associated branch at the same time another of said pins is mechanically moved along its axis into the aperture of its associated branch of said wave-guide, whereby the separate antennas are sequentially connected to said receiver.

DONALD K. ALLISON.

REFERENCES CITED

The following references are of record in the file of this patent:

UNITED STATES PATENTS

| Number | Name | Date |
|---|---|---|
| 1,184,400 | Wilson | May 23, 1916 |
| 1,569,325 | Leib | Jan. 12, 1926 |
| 1,932,469 | Leib | Oct. 31, 1933 |
| 2,189,549 | Hershberger | Feb. 6, 1940 |
| 2,205,560 | Herzog | June 25, 1940 |
| 2,223,224 | Newhouse | Nov. 26, 1940 |
| 2,231,929 | Lyman | Feb. 18, 1941 |
| 2,396,044 | Fox | Mar. 5, 1946 |
| 2,396,112 | Morgan | Mar. 5, 1946 |
| 2,407,275 | Hays, Jr. | Sept. 10, 1946 |
| 2,407,305 | Langstroth et al. | Sept. 10, 1946 |
| 2,415,242 | Hershberger | Feb. 4, 1947 |
| 2,463,094 | Field et al. | Mar. 1, 1949 |
| 2,484,822 | Gould | Oct. 18, 1949 |
| 2,530,979 | Matland et al. | Nov. 21, 1950 |